United States Patent [19]
Payraudeau et al.

[11] Patent Number: 6,007,721
[45] Date of Patent: Dec. 28, 1999

[54] METHOD AND SYSTEM FOR REGULATING THE ADDITION OF OXYGENATED GAS INTO A BIOFILTER WITH RISING CURRENTS

[75] Inventors: Michele Payraudeau, Eaubonne; Arnaud Gisclon, Poissy, both of France

[73] Assignee: Omnium de Traitement et de Valorisation (OTV), Saint Maurice Cedex, France

[21] Appl. No.: 09/098,100

[22] Filed: Jun. 16, 1998

[30] Foreign Application Priority Data

Jun. 19, 1997 [FR] France .................................. 97 07885

[51] Int. Cl.⁶ .................................. C02F 3/06; C02F 1/00
[52] U.S. Cl. .......................... 210/614; 210/615; 210/617; 210/621; 210/742; 210/263; 210/274; 210/141; 210/149; 364/528.06; 364/528.08
[58] Field of Search ..................... 210/612, 614, 210/615–618, 620, 621, 758, 791, 792, 739, 742, 141, 220, 263, 418, 198.1, 274, 143, 149; 364/528.01, 528.06, 528.08

[56] References Cited

U.S. PATENT DOCUMENTS

| | | |
|---|---|---|
| 3,524,547 | 8/1970 | Nicol . |
| 4,162,195 | 7/1979 | Solyom et al. . |
| 4,192,742 | 3/1980 | Bernard et al. . |
| 4,564,453 | 1/1986 | Coplot et al. . |
| 4,654,147 | 3/1987 | Bagley . |
| 4,800,021 | 1/1989 | Desbos . |
| 5,106,511 | 4/1992 | Kodukula . |
| 5,288,407 | 2/1994 | Bodwell et al. . |
| 5,441,642 | 8/1995 | Wickens . |
| 5,482,630 | 1/1996 | Lee et al. . |
| 5,591,635 | 1/1997 | Young et al. . |
| 5,702,499 | 12/1997 | Timmenga . |

FOREIGN PATENT DOCUMENTS

| | | |
|---|---|---|
| 0265303A1 | of 1988 | European Pat. Off. . |
| 0630860A1 | of 1994 | European Pat. Off. . |
| 3019698A1 | of 1980 | Germany . |

Primary Examiner—David A. Simmons
Assistant Examiner—Fred Prince
Attorney, Agent, or Firm—Coats & Bennett, P.L.L.C.

[57] ABSTRACT

The invention relates to a method for regulation of aeration in a biological filter of the type comprising conveyance means (3) bringing water to be filtered into the lower part of the filter, a filter bed (2) acting as a support to the biomass, means of distributing an oxygenated gas (5, 5a) in the filter bed (2), a layer of filtered water (7) above the said filter bed, a nozzle for (4) of discharging the filtered water in the upper part of the filter, characterized in that it consists of taking account of the efficiency Ct with which the biomass uses the distributed oxygen to regulate the said distributed oxygenated gas flow and/or its concentration in molecular oxygen, in order to optimize the quantity of molecular oxygen distributed by the said distribution means.

16 Claims, 5 Drawing Sheets

METHOD AND SYSTEM FOR REGULATING THE ADDITION OF OXYGENATED GAS INTO A BIOFILTER WITH RISING CURRENTS

This invention relates to the water treatment domain and a method for regulating the addition of oxygenated gas into a biological filter (biofilter).

More precisely, the invention relates to a method that could be used in a filter of the type comprising:

- conveyance means in the lower part of the filter, supplying water to be filtered,
- a filter bed (usually composed of at least one layer of a granular filtration material with a density less than or greater than the density of water, but which may also consist of a fixed structured infill) acting as a support for a biomass used to degrade carbon-based and/or nitrogen-based pollution in the water to be filtered.
- means of distributing an oxygenated gas (usually air) in at least part of the said filter bed,
- a reserve area provided above the said filter bed in order to form a layer of water above it, and,
- means of removing the filtered water that has passed upwards through the filter, provided in the upper part of the filter.

This type of filter is well known in the state of the art and in particular is described in European patent EP-265303 in the name of the Applicant. They have many advantages, including the possibility of treating different types of pollution (carbon-based and/or nitrogen-based) within a restricted treatment volume, and a high treatment capacity. The reserve area with which they are provided may also be advantageously used to efficiently distribute clean water in the opposite direction of the treatment current in order to quickly wash the filter bed (backwash).

The invention's main applications are in the domain of biological purification of waste water.

As mentioned above, biological filters of the type described above to which the invention is applicable may be used in particular to biologically degrade carbon-based and/or nitrogen-based pollution contained in water to be filtered.

Concerning the treatment of carbon-based pollution, the biomass used is mostly heterotrophic, which in the presence of oxygen degrades most carbon-based organic compounds. Therefore it is useful to distribute oxygenated gas in most of the filter bed for this purpose.

Concerning the treatment of nitrogen-based pollution, this type of filter is used distributing oxygenated gas in part of the filter bed only so as to create an upper aerobic area and a lower anoxic area, while allowing recycling of part of the filtered water. Ammonia pollution in the water to be filtered is thus degraded into nitrates by a biomass that is mainly autotrophic in the aerobic area (nitrification step), these nitrates then being degraded into nitrogen gas by a mainly heterotrophic biomass consuming the oxygen in nitrates in the lower anoxic part of the filter, in the absence of molecular oxygen (denitrification step).

This type of filter can also be used in tertiary nitrification, using a mainly autotrophic biomass and distributing oxygenated gas throughout the entire filter bed.

Another known way of adapting this type of filter to these different configurations is to provide them firstly with first means of distributing an oxygenated gas in their lower part in order to distribute oxygenated gas throughout the entire filter bed, and secondly second means of distributing an oxygenated gas in the middle part of the filter, so that this oxygenated gas can be distributed only in the upper part of this filter bed.

Regardless of the configuration used, one of the problems introduced by using this type of biological filter is the difficulty of distributing the oxygenated gas necessary for the biological methods and achieving a compromise consisting of:

- providing sufficient distribution of this oxygenated gas within the filter bed, in order to enable the biomass to completely fulfill its function;
- while economizing the distributed oxygenated gas.

It is known that the distributed quantity of oxygenated gas can form a large proportion of the operating costs of this type of biofilter. One of the main concerns of the expert in the subject is therefore to find technical solutions for achieving the compromise mentioned above.

One way of approaching this objective is to empirically modulate the added oxygenated gas as a function of normal average variations in the polluting quantities and water flow to be treated. This method has the disadvantage that the flows of distributed oxygenated gas only very approximately match the actual needs of the biomass, and therefore introduce the risk of excessive or inadequate input of gas.

Another method is to estimate the theoretical quantity $Q_{o2}$ of oxygen necessary for the biomass present in the filter, using a formula of the following type:

$$Q_{o2} = 4.57\, Q'_{N\text{-}NH3} + \alpha Q'_{DCOS} + \beta Q_{DCOP}$$

in which $Q'_{N\text{-}NH3}$ is the quantity of eliminated ammonia pollution, $Q'_{DCOS}$ is the quantity of eliminated soluble carbonated pollution and $Q_{DCOP}$ is the quantity of applied particular carbonated pollution ($Q_{o2}$, $Q'_{N\text{-}NH3}$, $Q'_{DCOS}$ and $Q_{DCOP}$ being expressed in kilograms, $\alpha$ and $\beta$ being constants known to the expert in the subject) and adapting the distributed flow of oxygenated gas as a function of $Q_{o2}$.

However, application of this type of formula makes it necessary to use sophisticated instruments to measure the representative concentration of the pollution quantity incoming into the filter and outgoing from the biofilter. These instruments have the disadvantage of being expensive. This type of method cannot be used sufficiently frequently to enable continuous or quasi-continuous matching of air flows with the biomass needs. Furthermore, response times are long.

Note also that another well known method is to measure the concentration of dissolved oxygen in the filtered water using a biological filtration device, and depending on the result obtained, adapting the air quantity distributed in this filtration device. However this technique is very approximate, since it does not take account of oxygen transfer from the gaseous phase to the aqueous phase which takes place during the filtration, and therefore only offers an imperfect solution to the compromise mentioned above.

The main purpose of this invention is to provide a technical solution for satisfying the compromise mentioned above, and without the disadvantages in state of the art solutions.

In particular, one purpose of the invention is to describe such a method for continuously or semi-continuously adapting oxygenated gas flows distributed in the biofilter to the needs of the biomass without exceeding them, in order to economize this gas.

These various purposes are achieved by the invention which relates to a method for regulation of aeration in a biological filter of the type comprising:

conveyance means bringing water to be filtered provided into the lower part of the filter, a filter bed acting as a support to the biomass used to degrade carbon-based and/or nitrogen-based pollution of the water to be filtered, means of distributing an oxygenated gas in at least part of the said filter bed, a layer of filtered water provided above the said filter bed, and means of distributing the filtered water that has passed upwards through the filter, provided in the upper part of the filter, characterized in that it consists of taking account of the efficiency Ct with which the biomass uses the distributed oxygen to regulate the said distributed oxygenated gas flow and/or its concentration in molecular oxygen, in order to optimize the quantity of molecular oxygen distributed by the said distribution means.

Therefore, the invention proposes to regulate the quantity of oxygen distributed in the biofilter, taking account of the usage efficiency of oxygen in the biomass, rather than simply the concentration of oxygen in the water at the outlet from the biofilter.

The expert in the subject knows that the total oxygen input by the oxygenated gas distribution means in a biofilter is not available directly, and that there is an oxygen transfer from the gas phase to the biomass. However, in the past it was standard practice to consider that the efficiency of this transfer ("transfer coefficient" or "oxygen usage efficiency by the biomass") depended partly on operating conditions (water and air speed) and also on the filter characteristics (aeration system, depth of filter bed, etc.). However, the Applicant has shown that measuring the oxygen concentration dissolved in water at the outlet from the filter bed and the treated water temperature are sufficient to determine the oxygen usage efficiency.

According to a preferred variant of the invention, the method includes steps consisting of:

measuring the dissolved oxygen ($O_2$) concentration in the filtered water, in the said water layer;

measuring the temperature T of the filtered water;

calculating the oxygen usage efficiency $C_T$ by the said biomass as a function of the measured temperature T and the measured dissolved oxygen ($O_2$) concentration;

adjusting the oxygenated gas flow distributed by the said distribution means depending on the said calculated usage efficiency $C_T$.

More precisely, the method thus includes steps consisting of:

fixing a reference oxygenated gas flow $Q_{gas\ t}$ at a given time t;

fixing a reference efficiency $C_{Tref}$ for oxygen usage by the biomass;

measuring the temperature T of the filtered water at time t+1;

measuring the concentration of dissolved oxygen (O2) in the said filtered water layer at the said time t+1;

calculating the said oxygen usage efficiency $C_T$ by the biomass;

calculating the oxygenated gas flow Qgas t+1 necessary at time t+1;

regulating the flow and/or concentration of the said oxygenated gas distributed by the said distribution means as a result of the result obtained.

According to another variant of the invention, the method comprises steps consisting of:

fixing a reference dissolved oxygen concentration ($O_{2ref}$) corresponding to a reference temperature and a reference usage efficiency $C_{Tref}$;

measuring the temperature T of the treated water;

calculating the dissolved oxygen concentration ($O_2$) corresponding to the measured temperature T;

regulating the flow and/or concentration of oxygenated gas distributed by the said distribution means as a function of the result obtained, so that the concentration of dissolved oxygen corresponds to the reference dissolved oxygen concentration.

In the first variant of the method, the concentration of dissolved oxygen and the temperature are measured to regularly determine the usage efficiency, the input oxygenated gas being regulated for preferred operation at the reference efficiency.

In the second variant, a reference dissolved oxygen concentration is fixed as a function of the temperature to determine a reference usage efficiency, the added oxygen gas being regulated for a given concentration of dissolved oxygen.

These two methods are obviously equivalent and based on the same inventive concept.

In practice, a measurement should be made of the concentration of dissolved oxygen at a height H equal to at least the height Hmin sufficient to enable dissolution of most gaseous oxygen leaving the said filter bed in the form of bubbles. Preferably, this height H will exceed this height Hmin and may vary as a function of the filter structure. This type of variant makes it possible to ensure that the maximum concentration of dissolved oxygen is measured. Hmin will vary as a function of a large number of parameters (incoming oxygenated gas flow, nature of the filter bed, height of the filter bed, etc.).

Preferably, the temperature of the treated water is also measured in the said water layer. However, it would be possible to measure this temperature at another location in the biofilter.

Also preferably, the said oxygenated gas is air and the said oxygen usage efficiency $C_T$ by the biomass is calculated using the following formula:

$$C_T = [475 - O_2(33.5+T)]/[475 - 0.21 O_2 \times (33.5+T)]$$

in which T is the filtered water temperature and O2 is the concentration of dissolved oxygen in the treated water. However, the expert in the subject could consider other formulas for embodiment of the method according to the invention, and particularly when (exceptionally) a gas other than air is to be used as the oxygenated gas, for example air enriched in oxygen or pure oxygen.

Also according to a variant according to the invention, the method is carried out semi-continuously and consists of measuring quantities of dissolved oxygen at different times t', t", t"' . . . t+1, calculating the average of the measured quantities of dissolved oxygen $O_{2moy}$, measuring the treated water temperatures at different times t', t", t"' . . . t+1, calculating the average Tmoy of the measured temperatures and calculating the said oxygen usage efficiency $C_T$ by the biomass using $O_{2moy}$ and $T_{moy}$.

In another variant, the method is applied continuously.

The invention also relates to a biological filter for water treatment of the type described above, characterized in that it comprises means of measuring the dissolved oxygen concentration in the said water layer, and it includes means of measuring the filtered water temperature.

Advantageously, these measurement means consist of at least one sensor installed in the said water layer at a height H from the upper surface of the said filter bed, the said height H exceeding the minimum height Hmin, and sufficient to enable dissolution of oxygen gas outlet from the filter in the form of bubbles until a balance is reached.

BRIEF DESCRIPTION OF THE DRAWINGS

The invention and its various advantages, will be more easily understood after reading the following description of a non-restrictive embodiment with reference to the drawings in which.

Figure 1:
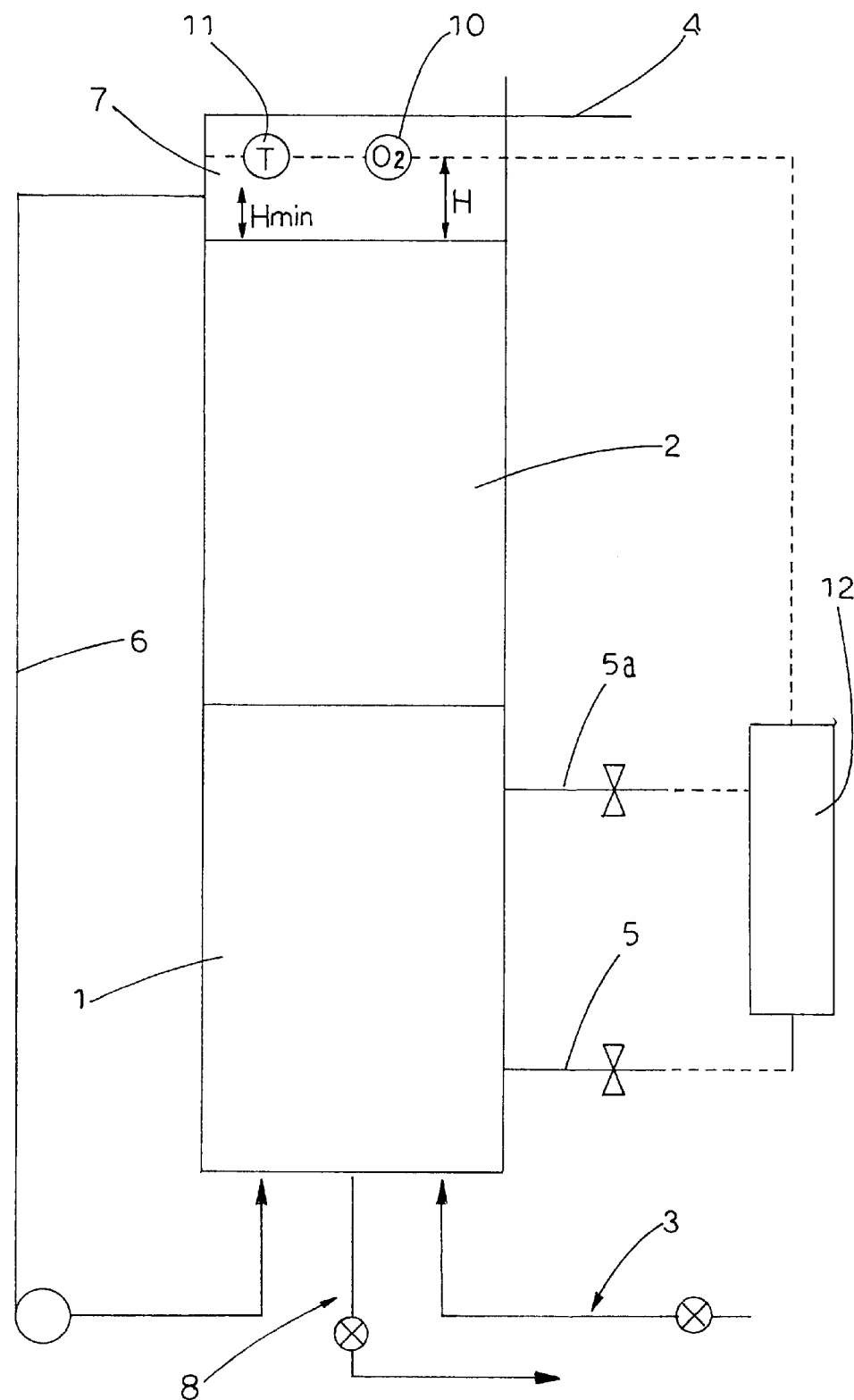
FIG. 1 shows a schematic view of a biological filter for embodiment of the method according to the invention.

The biological filter shown in FIG. 1 includes a reaction vessel 1 provided with a filter bed of granular material 2 acting as a support for a biomass, conveyance means 3 bringing water to be treated into the lower part of the reaction vessel, and means 4 of evacuating the treated water after it has passed upwards through filter bed 2 provided in the upper part of the reaction vessel. Conventionally, an aeration manifold 5 is provided in the lower part of the filter and a manifold 5a is provided in its intermediate part so that an upper aerated filtration area and a lower anoxic filtration area may be installed if necessary. A loop 6 for recirculation of filtered water is also normally provided. In its upper part, the reaction vessel includes an area 7 above the filter bed and can be used to build a reserve of treated water and is also provided with purge means 8 in the lower part of the filter.

The reaction vessel according to this invention is provided with means of measuring the dissolved oxygen including a sensor 10 installed in the said reserve area at a height H (in this particular embodiment equal to 50 cm) above the upper surface of filter bed 2. This height H exceeds the height Hmin (about 40 cm for this embodiment) necessary for good dissolution of gaseous oxygen present in air bubbles with depleted oxygen content that leave it.

Also according to the invention, the reaction vessel is provided with a temperature sensor 11 that determines the temperature (T) of the filtered water outlet from the filter bed 2, this sensor being also installed in the clean water reserve area 7.

Sensors 11 and 10 are connected to a calculation and regulation unit 12 used to modify the aeration inlet manifolds 5 and/or 5a, in order to regulate distributed air flows as a function of data transmitted by them.

When the method according to the invention is implemented, the following reference data are input into the calculation and regulation unit at time t.

initial air flow Qt;

reference usage efficiency $C_{Tref}$ chosen as a function of the initial quantity of pollution in the water to be filtered.

During filtration, the dissolved oxygen concentration (O2) and the temperature (T) of the filtered water in the reserve area are acquired at regular time intervals. Unit 12 then calculates the oxygen usage efficiency $C_T$ provided by the biomass using the following formula:

$$C_T = [475 - 02(33.5+T)]/[475 - 0.2102 \times (33.5+T)]$$

then the corresponding air flow $Q_{t+1}$ necessary to keep the effective usage efficiency equal to or close to the reference usage efficiency $C_{Tref}$ using the following formula:

$$Q_{t+1} = (Q_t \times C_T)/C_{Tref}$$

If the calculated efficiency $C_T$ is equal to or approximately equal to $C_{Tref}$, the air flow input through manifold 5 and/or 5a is not modified. Otherwise, unit 12 acts on the supply means to these manifolds either to reduce or increase the distributed air flows.

Figure 2:
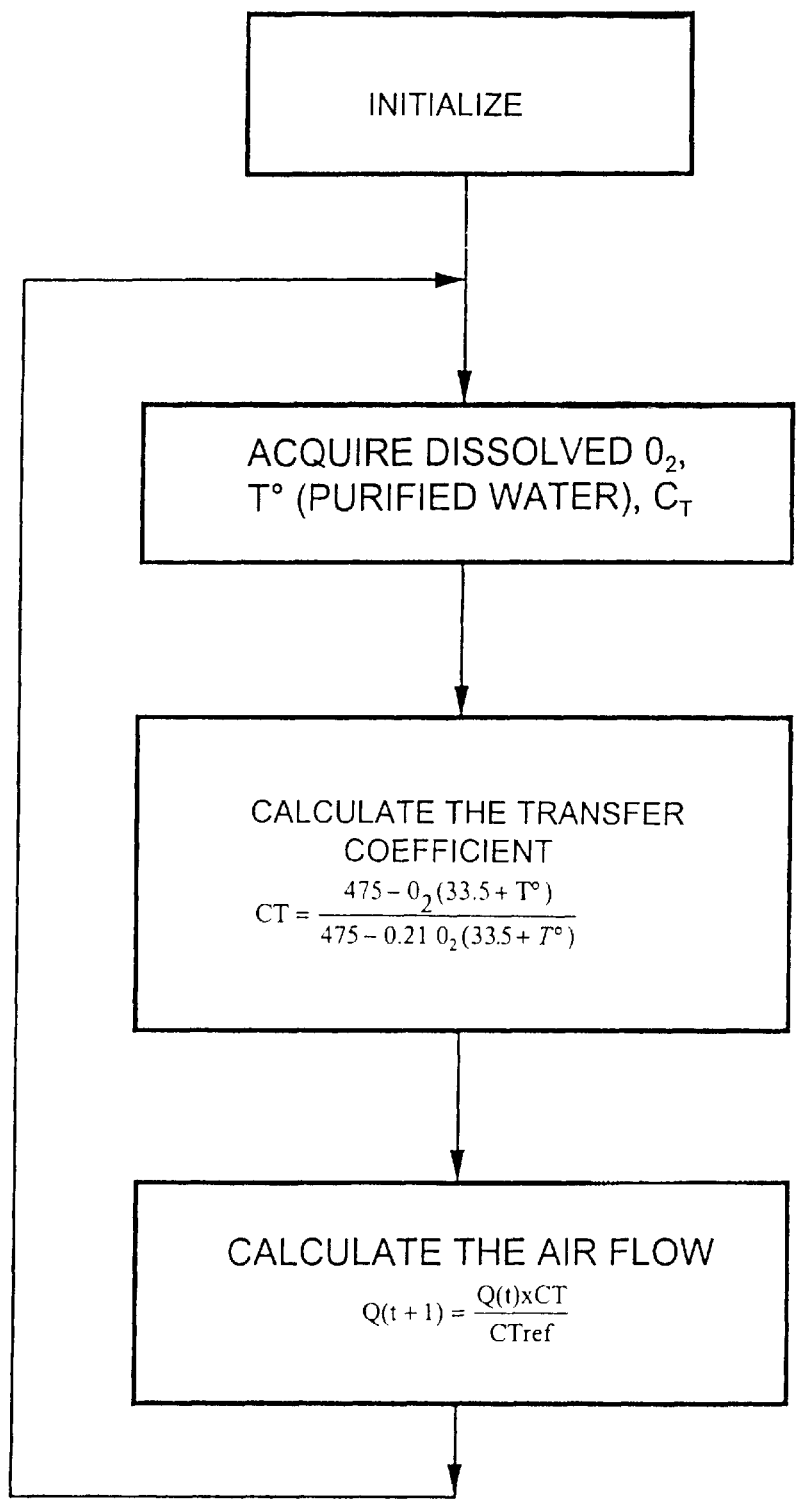
FIG. 2 is a flow chart showing the various steps in a preferred variant of the method according to the invention.

The operation described above is summarized in the flow chart shown in FIG. 2.

Figure 3:
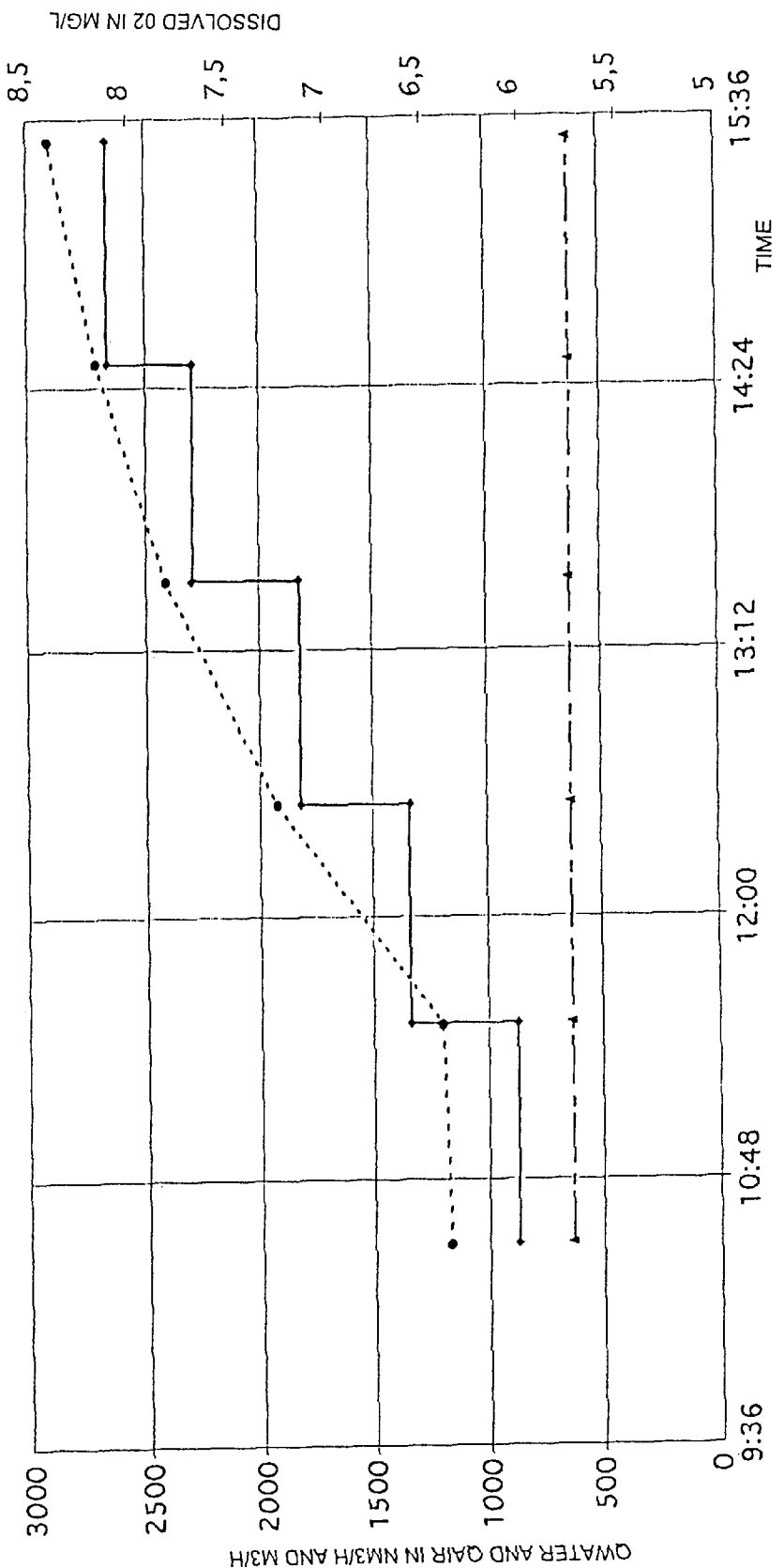
FIG. 3 is a graph showing the variation with time of the concentration of dissolved oxygen at the filter outlet at a constant water flow and as a function of different air flows.

FIG. 3 shows the variation in the quantity of dissolved oxygen measured according to the invention at the outlet from the filter bed in the reserve area 7 as a function of different air flows input to the biomass varying from 900 Nm3/H to 2600 Nm3/H, for a constant water flow of 650 m3/H corresponding to a practically constant polluting quantity. This graph clearly shows that above a certain air flow, the concentration of dissolved oxygen in the filtered water increases, resulting in the biomass failing to use an increasing proportion of the available oxygen in the input air.

Figure 4:
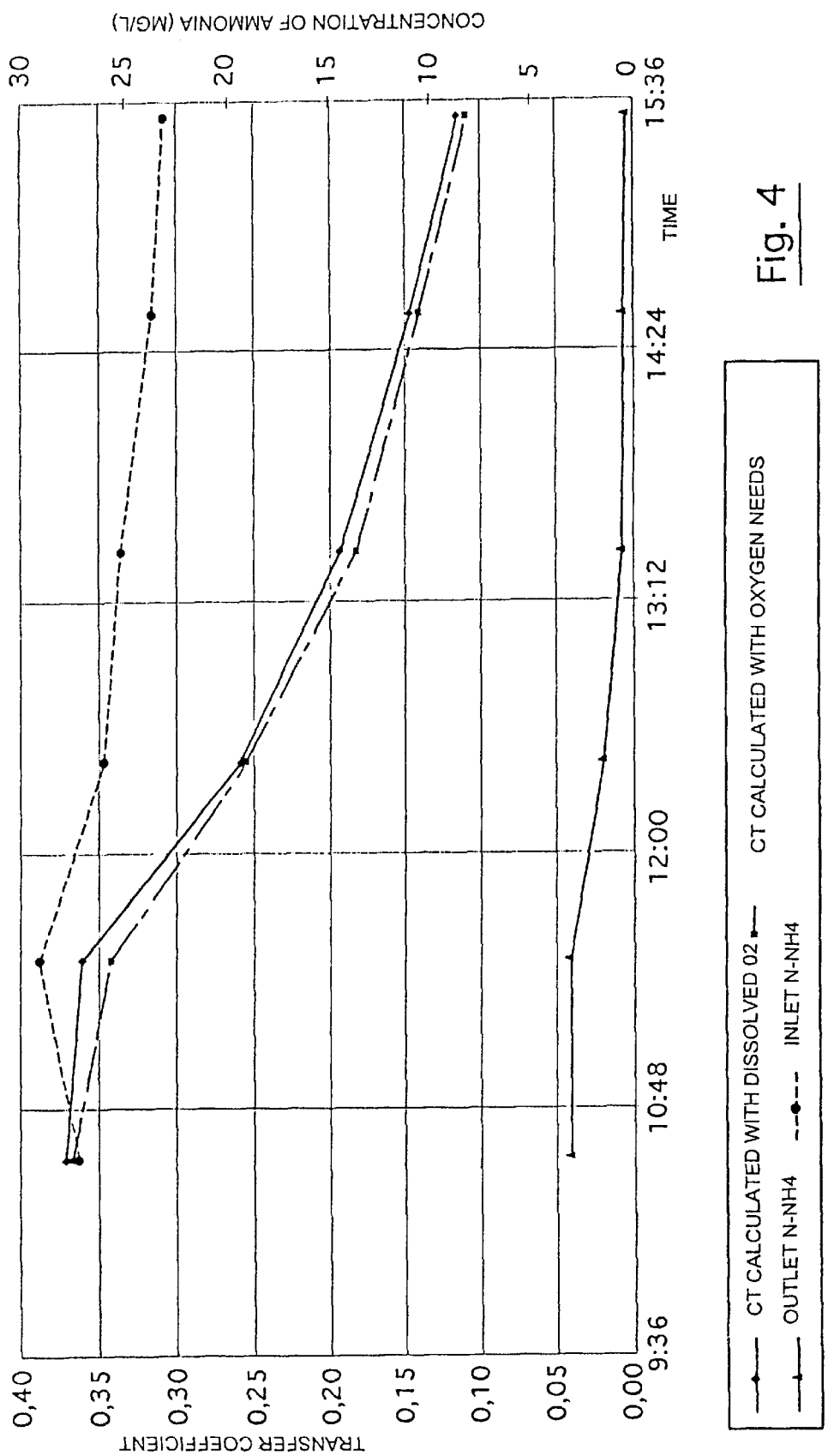
FIG. 4 is a graph showing the variation in time of the usage efficiency $C_T$ as a function of variations in the quantity of ammonia pollution entering into the biofilter and the quantity of ammonia polluting output from the biofilter.

FIG. 4 shows the variation with time of the usage efficiency $C_T$ as a function of variations in the quantity of ammonia pollution entering the biofilter and the quantity of ammonia pollution at the exit from the biofilter. This graph shows that a biomass usage efficiency $C_T$ of 0.30, corresponding to a low air input, can reduce pollution as much as an efficiency of 0.10 corresponding to a high air input. This graph also shows that the biomass needs (calculated according to the formula $Q_{O2} = 4.57 Q'_{N-NH3} + \alpha Q'_{DCO} + \beta Q_{DCO}$ mentioned above) approximately correspond to measured values of $C_T$ which confirms the reliability of this parameter.

Figure 5:
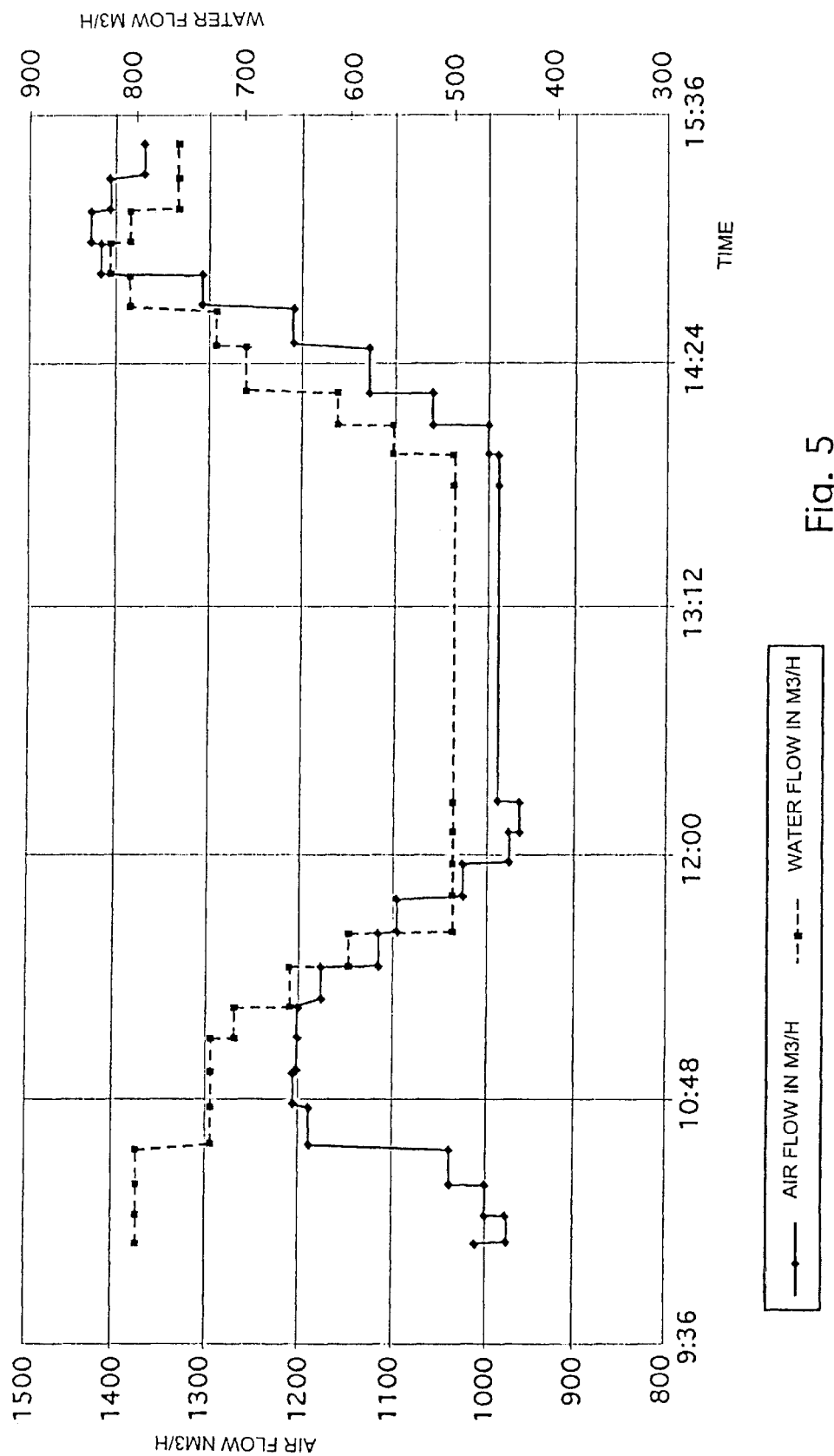
FIG. 5 is a graph showing regulation of observed air flows in an embodiment of the method according to the invention.

The results obtained in this example embodiment are summarized in table I and in FIG. 5 that shows regulation in time of the air flow distributed in the filter as a function of the observed water flow at the filter inlet for a reference efficiency $C_{Tref}$ equal 0.2. The curves on this figure show that the distributed air quantity is modified as a function of the water flow. This graph shows the first eight measurements made during the filter start up period after washing when the water flow is high and the added air flow is low. This is due to the gradual evacuation of clean washing water present in the filter implying a low concentration of pollutants and consequently a lower oxygen need in the biomass.

TABLE 1

| Time | Measured CT | Qgas Nm3/h | Qwater m3/h |
| --- | --- | --- | --- |
| 10:06 | 0.1890 | 1008 | |
| 10:16 | 0.2138 | 969 | 790 |
| 10:26 | 0.2190 | 1000 | 790 |
| 10:36 | 0.2082 | 1041 | 790 |
| 10:46 | 0.2024 | 1190 | 720 |
| 10:56 | 0.2001 | 1204 | 720 |
| 11:06 | 0.1997 | 1199 | 720 |
| 11:16 | 0.1964 | 1200 | 690 |
| 11:26 | 0.1902 | 1170 | 650 |
| 11:36 | 0.1963 | 1117 | 600 |

TABLE 1-continued

| Time | Measured CT | Qgas Nm3/h | Qwater m3/h |
|---|---|---|---|
| 11:46 | 0.1875 | 1095 | 500 |
| 11:56 | 0.1884 | 1025 | 500 |
| 12:06 | 0.1969 | 974 | 500 |
| 12:16 | 0.1991 | 965 | 500 |
| 13:46 | 0.1985 | 987 | 500 |
| 13:56 | 0.2032 | 984 | 500 |
| 14:06 | 0.2111 | 1000 | 560 |
| 14:16 | 0.2153 | 1060 | 620 |
| 14:26 | 0.2154 | 1127 | 690 |
| 14:36 | 0.2164 | 1208 | 720 |
| 14:46 | 0.2169 | 1305 | 790 |
| 14:56 | 0.2022 | 1418 | 820 |
| 15:06 | 0.1959 | 1430 | 790 |
| 15:16 | 0.1960 | 1405 | 750 |
| 15:26 | 0.2004 | 1365 | 750 |

The embodiment of the invention described here is not intended to reduce the scope of the invention. Therefore, many modifications could be made without going outside its scope. In particular, note that the method may be used regardless of the filter configuration, as long as the configuration includes distribution of an oxygenated gas.

We claim:

1. A method of treating waste water and regulating the aeration of a biological filter used in treating the waste water, comprising:

a) directing waste water into the biological filter and through a filter bed that supports a biomass used to degrade carbon-based and/or nitrogen-based pollution of the water to be filtered;

b) directing an oxygenated gas into the filter bed and distributing the oxygen throughout the filter bed;

c) holding a layer of filtered water above the filter bed;

d) discharging the filtered water from the biological filter; and e) determining the efficiency with which the biomass uses the distributed oxygen by determining a factor $C_T$, which is a function of temperature and dissolved oxygen concentration, and regulating the oxygenated gas flow into the biomass in accordance with the determined factor $C_T$.

2. The method of claim 1 wherein the factor $C_T$ is determined by measuring the dissolved oxygen concentration in the layer of filtered water held above the filter bed.

3. The method of claim 2 wherein the temperature function is measured in the layer of filtered water.

4. The method of claim 1 including selecting a reference factor $C_{T\ ref}$; continuously measuring the factor $C_T$; and varying the flow of oxygenated gas to the biomass such that the measured factor $C_T$ approaches or approximates the reference factor $C_{T\ ref}$.

5. The method of claim 1 wherein the factor $C_T$ is determined by measuring both the temperature and dissolved oxygen concentration in the layer of filtered water held above the filter bed.

6. Method according to claim 1 characterized in that the method includes the steps:

fixing a reference oxygenated gas flow $Q_{gas}$ at a given time t;

fixing a reference efficiency factor $C_{T\ ref}$ for oxygen usage by the biomass;

measuring the temperature T of the filtered water at time t+1;

measuring the concentration of dissolved oxygen ($O_2$) in the filtered water layer at the said time t+1;

calculating the oxygen usage efficiency $C_T$ by the biomass;

calculating the oxygenated gas flow $Q_{gas(t+1)}$ necessary at time t+1;

regulating the flow and/or concentration of the oxygenated gas directed into the filter bed as a result of the results obtained.

7. Method according to claim 1, characterized in that the method comprises:

fixing a reference dissolved oxygen concentration corresponding to a reference temperature and a reference usage efficiency $C_{T\ ref}$;

measuring a temperature T of the treated water;

calculating the oxygen ($O_2$) concentration dissolved by the biomass as a function of the reference usage efficiency $C_{T\ ref}$ and the measured temperature T; and regulating the flow and/or concentration of oxygenated gas directed into the filter bed as a function of a result obtained from said calculation, so that the concentration of dissolved oxygen corresponds to the reference dissolved oxygen concentration.

8. Method according to claim 1, characterized in that the dissolved oxygen ($O_2$) concentration is measured in the filtered water layer (7) at not less than a height H sufficiently above the upper surface of the filter bed to enable dissolution of gaseous oxygen output from the filter bed until equilibrium.

9. Method according to claim 1, characterized in that the temperature function of the filtered water is measured in the water layer (7).

10. Method according to claim 1, characterized in that the oxygenated gas is air and the oxygen usage efficiency $C_T$ by the biomass is calculated using the following formula:

$$C_T = \{475 - O_2(33.5+T)\} / \{475 - 0.21 O_2 \times (33.5+T)\}$$

in which T is the filtered water temperature and $O_2$ is the concentration of dissolved oxygen in the filtered water.

11. Method according to claim 1, further comprising: measuring quantities of dissolved oxygen at different times t', t'', t''' ... t+1, calculating the average of the measured quantities of dissolved oxygen $O_{2moy}$, measuring the filtered water temperatures at different times t', t'', t''' ... t+1, calculating the average $T_{moy}$ of the measured temperatures and calculating the oxygen usage efficiency $C_T$ by the biomass using $O_{2moy}$ and $T_{moy}$.

12. Method according to claim 1, characterized in that the method is implemented continuously.

13. A system for treating waste water and regulating the flow of oxygenated gas into the system, comprising:

a) a biological filter having a housing and a filter bed for supporting a biomass disposed within the housing;

b) an inlet for directing waste water into the biological filter;

c) an oxygenated gas inlet for directing oxygenated gas into the biological filter and through the filter bed;

d) the housing having a water holding area disposed over the filter bed for holding filtered water;

e) a dissolved oxygen sensor disposed within the water holding area and, during waste water treatment, submerged within the filtered water held therein; and f) a calculation and regulation unit for determining the efficiency $C_T$ with which the biomass uses dissolved oxygen by determining the dissolved oxygen concentration in the filtered water held within the water holding area, and in response to the determined $C_T$, varying the flow of oxygenated gas into the biological filter so as generally to increase the efficiency of the dissolved oxygen uptake by the biomass.

14. The system of claim 13 including a temperature sensor disposed within the water holding area and during waste water treatment submerged within the filtered water disposed therein, and wherein the calculation and regulation unit in determining $C_T$ utilizes the measured temperature by the temperature sensor.

15. The system of claim 13 wherein for a given initial quantity of pollution in the water to be filtered, there is a $C_{Tref}$ and wherein the calculation and regulation unit controls the flow of oxygenated gas into the biological filter, such that $C_T$ at various times approaches or approximates $C_{Tref}$.

16. The system of claim 14 wherein said temperature sensor and said dissolved oxygen sensor are placed in the filtered water at a height H above the upper surface of the filter bed, the height H being greater than the height $H_{min}$, sufficient to enable dissolution of gaseous oxygen output from the filter bed in the form of bubbles until equilibrium.

* * * * *